Figures 1, 2:
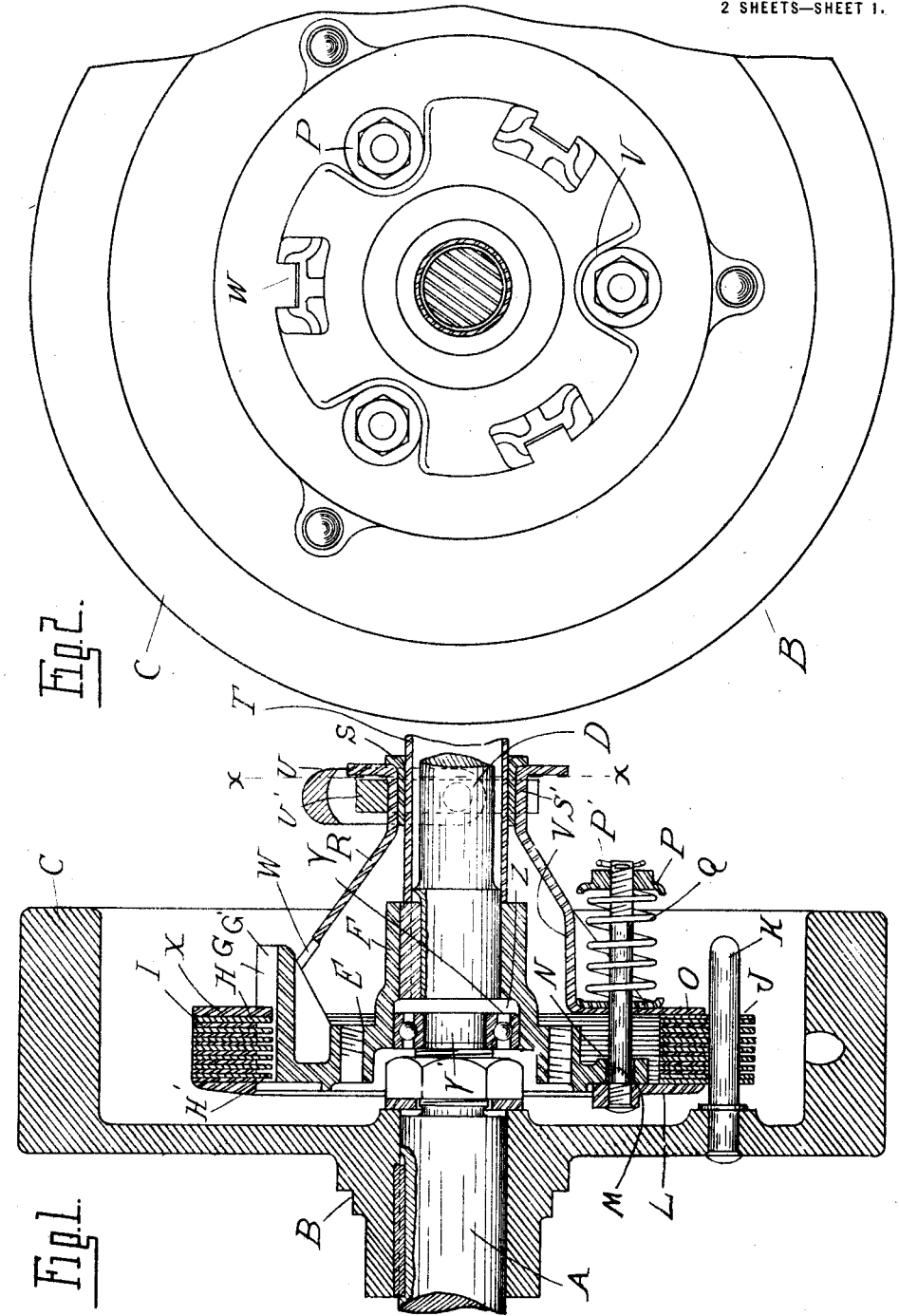

J. G. UTZ.
FRICTION CLUTCH.
APPLICATION FILED DEC. 12, 1908.

1,171,008.

Patented Feb. 8, 1916.
2 SHEETS—SHEET 1.

Witnesses

Inventor
John G. Utz
By Whittemore Hulbert Whittemore
Attys

J. G. UTZ.
FRICTION CLUTCH.
APPLICATION FILED DEC. 12, 1908.
1,171,008.
Patented Feb. 8, 1916.
2 SHEETS—SHEET 2.
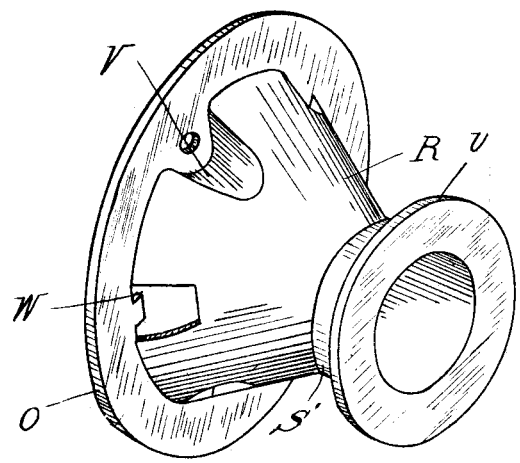
Fig.3.
Fig.4.
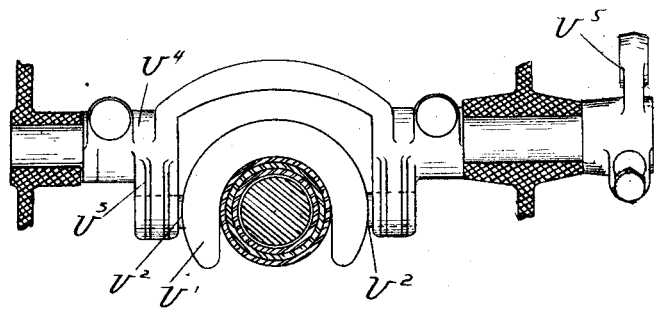
Witnesses
Inventor
John G. Utz

UNITED STATES PATENT OFFICE.

JOHN G. UTZ, OF DETROIT, MICHIGAN, ASSIGNOR TO CHALMERS MOTOR COMPANY, OF DETROIT, MICHIGAN, A CORPORATION OF MICHIGAN.

FRICTION-CLUTCH.

1,171,008. Specification of Letters Patent. Patented Feb. 8, 1916.

Application filed December 12, 1908. Serial No. 467,231.

*To all whom it may concern:*

Be it known that I, JOHN G. UTZ, a citizen of the United States of America, residing at Detroit, in the county of Wayne and State of Michigan, have invented certain new and useful Improvements in Friction-Clutches, of which the following is a specification, reference being had therein to the accompanying drawings.

The invention relates to friction clutches of the multiple disk type, being more particularly designed for use in automobile transmissions.

The invention consists in certain features of construction as hereinafter set forth.

In the drawings Figure 1 is a longitudinal central section through the clutch; Fig. 2 is an end elevation; Fig. 3 is a perspective view of one of the elements, and Fig. 4 is a section on line x—x, Fig. 1.

A is the drive shaft, such as the main shaft of the engine, and B is the fly wheel. My improved clutch is preferably located within the space surrounded by the annular flange C of the fly wheel, and is of the following construction.

D is the transmission shaft, which is arranged in axial alinement with the shaft A. E is a head secured by its hub F to the inner end of the shaft D and provided at its periphery with a plurality of bearings G for engagement with one series of the friction disks H. These disks H are of annular form and together with the coöperating interspaced series of disks I are arranged about the periphery of the head E. The disks H are cut with inwardly extending tongues H′ which engage longitudinally-extending slots or key seats G′ in the bearings G. The disks I are provided with outwardly-extending ears J, which are apertured to receive the drive pins K projecting laterally from the web of the fly wheel B. Thus the disks I are anchored by the pins K to the fly wheel B on the shaft A, while the disks H are connected through the medium of the head E to the shaft D.

The disks are pressed into frictional engagement with each other through the medium of annular plates in front and rear thereof. The rear plate L is detachably secured to the head E through the medium of pins or studs M. These are riveted or otherwise secured to the plate L and project through apertures N in the head E within the space encircled by the disks H and I. These pins or studs M also extend through the front plate O and at their outer ends have detachably secured thereto the bearings P for springs Q sleeved upon said studs. Thus the springs Q, which bear at their inner ends against a plate O, form the means of holding the disks in frictional contact. To release the clutch, the plate O is moved outward against the tension of the springs Q and the actuating connection for this purpose is preferably formed integral with said plate.

As illustrated in Fig. 3, S′ is the hub or bearing portion which terminates at its inner end in a conical member R, the plate O being formed by a flange at the large end of this conical or intermediate portion R; the latter serving as a housing for the hub F on the head E. There is also an out-turned flange U at the outer end of the bearing portion S′, with which an actuating lever is adapted to be engaged. The hub carries a bushing S which slidably engages the shaft D, or, as illustrated, a tubular casing T surrounding said shaft. The member R is further provided with depressions V in the conical portion thereof, which form recesses in which the springs P are located. There are, further, portions of the wall cut away at W to form apertures through which the guides G project and tongues X are formed to project inwardly from the annular portion O and to engage the guide grooves G′.

With the construction described, in operation the tension of the springs Q will normally hold the clutch in, while the releasing is effected by drawing outward upon the member R. As the flanges U and O are formed integral with the member R the construction of the clutch is simplified and the number of separate parts reduced, and at the same time the member R forms a housing for the hub F. The shafts A and D are preferably held in alinement by a ball bearing Y, which engages a projecting stud Y' on the end of the shaft A, and is located in a recess bearing Z in the head E. The shafts D and A may be separated by a relative longitudinal movement thereof and as the disks I are merely sleeved upon the studs K the clutch will be carried by the stud D and will be separated from the fly wheel, while the stud Y' will be slipped out of the bearing Y. Thus the transmission shaft may be disengaged from the drive shaft without dismounting the clutch.

It will be noted that back plate L is held in position and is secured to the head E merely by the studs or pins M, which pass loosely through the apertures N. Furthermore, the spring abutments P may be readily detached from the studs M with which they preferably have a screw thread engagement, and are locked by a cotter pin P'. When said abutments P are detached the clutch may be disassembled by slipping off the springs Q, disengaging the rear plate L from the head E by slipping out the studs M, after which the disks H and I may be removed. When the clutch is disengaged, it is desirable to check the rotation of the driven part. This I accomplish by providing the lever, which releases the clutch, with a shoe U', which frictionally engages the flange U and thus retards its rotation at the same time that it is releasing the pressure of the clamping plates against the friction disks H and I. As illustrated in Fig. 4, the shoe U' is provided with trunnions $U^2$, which pivotally engage rock arms $U^3$ upon a rock arm $U^4$, and $U^5$ is the actuating rock arm for the shaft.

What I claim as my invention is:

1. In a clutch, the combination with a series of annular friction disks, of a head within said disks engaging alternate members of the series, a member to which the other members of the series are connected, clamping plates at the ends of the series, said head and one of the clamping plates being provided with alined apertures, a pin secured to the other of said clamping plates and passing through said apertures, and a spring upon said pin for yieldingly drawing said plates together.

2. In a clutch, the combination with a series of annular friction disks, of a head within said disks engaging the alternate members of the series, a member to which the other members of the series are connected, an annular clamping plate for one end of the series, said head having an aperture therein, a pin on said clamping plate passing through said aperture, a movable clamping plate for the opposite end of the series, and a spring on said pin for yieldingly drawing said plates toward each other.

3. In a clutch, the combination with a series of annular friction disks, of a head within said disks engaging the alternate members of the series, a member to which the other members of the series are connected, clamping plates for the ends of the series, said head and one of the clamping plates being provided with alined apertures, a pin secured to the other of said clamping plates and passing through said apertures, a spring on said pin for yieldingly pressing said plates against the disks, and peripheral bearings on the disks which are free from said head for engaging said member.

4. In a clutch, the combination with a series of annular friction disks, of a head within said disks engaging the alternate members of the series, a member to which the other members of the series are connected, an annular clamping plate at one end of the series detachably engaging said head, a member having an annular flange forming the opposite clamping plate, said head and one of said clamping plates being provided with alined apertures, a pin secured to the other of said clamping plates and passing through said apertures, a spring upon said pin for yieldingly drawing said plates together, and an actuating flange on said member.

5. In a clutch, the combination with a series of annular friction disks, of a head within said disks engaging alternate members of the series, a member to which the other members of the series are connected, a shaft on which said head is mounted, a conical member having its small end slidably engaging said shaft and provided with an annular flange at its large end forming a clamping plate for said disk and an annular flange at its small end forming an actuating member, an annular clamping plate at the opposite end of the series, said head and the clamping plate on said conical member being provided with alined apertures, a pin projecting from the other clamping plate and passing through said apertures, and a spring on said pin for yieldingly drawing said plates against the disks.

6. A clutch comprising a shaft, a series of annular friction members concentric with said shaft, a head mounted on said shaft within said annular friction members and to which alternate members of the series are attached, a driven member to which the other members of the series are connected, a clamping plate for one end of the friction members, and a member at the opposite side of said annular friction members having a bearing portion sleeved on said shaft, an outwardly extending flange at the end of said bearing portion, a conical portion extending from the opposite end of said portion, an outwardly extending annular flange at the large end of said conical portion lying adjacent to and constituting a clamping plate for said friction members, a recess in said conical member, a clamping spring in said recess, and a connection from said spring passing within said annular friction members and engaging the opposite clamping plate.

In testimony whereof I affix my signature in presence of two witnesses.

JOHN G. UTZ.

Witnesses:
 NELLIE KINSELLA,
 W. J. BELKNAP.